(12) United States Patent
Dull

(10) Patent No.: US 9,796,248 B1
(45) Date of Patent: Oct. 24, 2017

(54) INTERMITTENT START COMPRESSOR

(71) Applicant: Ricky W. Dull, Rhome, TX (US)

(72) Inventor: Ricky W. Dull, Rhome, TX (US)

(73) Assignee: Standard Motor Products, Inc., Long Island City, NY (US)

( * ) Notice: Subject to any disclaimer, the term of this patent is extended or adjusted under 35 U.S.C. 154(b) by 0 days.

(21) Appl. No.: 15/193,133

(22) Filed: Jun. 27, 2016

Related U.S. Application Data

(62) Division of application No. 13/721,541, filed on Dec. 20, 2012, now Pat. No. 9,377,014.

(51) Int. Cl.
*B60H 1/32* (2006.01)
*F25B 49/02* (2006.01)
(Continued)

(52) U.S. Cl.
CPC ......... *B60H 1/3225* (2013.01); *B60H 1/3222* (2013.01); *B60H 1/3227* (2013.01);
(Continued)

(58) Field of Classification Search
CPC ................ B60H 1/3225; B60H 1/3222; B60H 2001/327; B60H 1/3227; F04B 39/00;
(Continued)

(56) References Cited

U.S. PATENT DOCUMENTS

| 2,978,879 | A | | 4/1961 | Heidorn | |
|---|---|---|---|---|---|
| 3,462,964 | A | * | 8/1969 | Haroldson | B60H 1/0045 180/315 |

(Continued)

FOREIGN PATENT DOCUMENTS

| JP | 55012277 A | * | 1/1980 |
|---|---|---|---|
| JP | S55-012277 | | 1/1980 |

(Continued)

OTHER PUBLICATIONS

English abstract of JP55012277A dated Jan. 28, 1980.*

*Primary Examiner* — Nathan Zollinger
(74) *Attorney, Agent, or Firm* — Law Office of William Gustavson, PC

(57) ABSTRACT

A switch (10, 200) is provided for installation in the air conditioning (A/C) system (12) in a vehicle (16) for intermittently operating the clutch (20) in the A/C system (12) each time the control (44) in the A/C system (12) provides power to operate the clutch (20) to prevent slugging. This turns the compressor (14) a few turns each time the clutch (20) is energized during intermittent operation to purge liquid refrigerant and lubricant from the compressor (14) to prevent slugging. The switch (10, 200) can be installed in existing vehicles by connecting the switch (10, 200) in the wiring harness (18) of the A/C system (12) to the power lead (38) from the control (44) to the clutch (20) and between the ground lead (40) from the clutch (20) and a ground. The switch (10, 200) can include a microcontroller (52) for controlling the operation of a power transistor (70) to intermittently ground the clutch to provide the intermittent operation. A battery (202) can be provided to power the microcontroller (52) for a set period of time after an initial intermittent operation. This prevents additional intermittent operation for the set period of time.

16 Claims, 7 Drawing Sheets

(51) Int. Cl.
*F04B 39/00* (2006.01)
*F04B 35/00* (2006.01)

(52) U.S. Cl.
CPC .............. *F04B 39/00* (2013.01); *F25B 49/022* (2013.01); *F04B 35/00* (2013.01); *F25B 2500/26* (2013.01); *F25B 2600/0251* (2013.01)

(58) Field of Classification Search
CPC ........ F04B 35/00; F04B 35/01; F04B 35/002; F25B 2600/0251; F25B 2500/26; F25B 2500/28; F25B 49/022
USPC ............ 62/132, 133, 157; 307/10.7; 417/15, 417/223, 316
See application file for complete search history.

(56) References Cited

U.S. PATENT DOCUMENTS

| | | |
|---|---|---|
| 3,698,204 A | 10/1972 | Schlotterbeck et al. |
| 3,702,064 A | 11/1972 | Ciolli |
| 3,864,611 A | 2/1975 | Chang |
| 4,071,839 A | 1/1978 | Hollins |
| 4,128,854 A | 12/1978 | Ruminsky |
| 4,135,368 A | 1/1979 | Mohr et al. |
| 4,307,775 A | 12/1981 | Saunders et al. |
| 4,424,682 A | 1/1984 | Miska et al. |
| 4,481,784 A | 11/1984 | Elmslie |
| 4,919,195 A | 4/1990 | Tanino |
| 5,214,930 A | 6/1993 | Bendtsen |
| 5,415,004 A | 5/1995 | Lizuka |
| 5,533,353 A | 7/1996 | Baker et al. |
| 5,545,931 A * | 8/1996 | Wang .................... B60H 1/3208 307/10.1 |
| 5,761,918 A | 6/1998 | Jackson et al. |
| 5,832,990 A | 11/1998 | Eisenhour |
| 5,995,889 A | 11/1999 | Eisenhour |
| 6,145,325 A | 11/2000 | Hanselmann et al. |
| 6,272,871 B1 | 8/2001 | Eisenhour |
| 6,351,956 B1 | 3/2002 | Chen et al. |
| 6,626,001 B2 | 9/2003 | Hamachi et al. |
| 6,637,230 B2 | 10/2003 | Iwanami et al. |
| 6,640,564 B2 | 11/2003 | Yamashita et al. |
| 6,655,165 B1 | 12/2003 | Eisenhour |
| 7,836,715 B2 | 11/2010 | Eisenhour |
| 7,861,545 B2 | 1/2011 | Leupold |
| 9,377,014 B1 * | 6/2016 | Dull ........................ F04B 39/00 |
| 2001/0049943 A1 | 12/2001 | Nakamura et al. |
| 2006/0059930 A1 | 3/2006 | Eisenhour |
| 2011/0132014 A1 | 6/2011 | Eisenhour |

FOREIGN PATENT DOCUMENTS

| | | |
|---|---|---|
| JP | S58-116964 | 8/1983 |
| JP | 10-170080 | 6/1998 |
| JP | 2002-120551 | 4/2002 |
| JP | 2008-215647 | 9/2008 |

* cited by examiner

INTERMITTENT START COMPRESSOR

TECHNICAL FIELD

This invention relates to air conditioning systems, and in particular to air conditioning systems for use in vehicles.

BACKGROUND OF THE INVENTION

In an air conditioning (A/C) system, such as used in a vehicle, a compressor is typically used to compress a gaseous refrigerant. In a vehicle, the compressor is usually operated from the vehicle engine by a fan belt through an electrically controlled clutch. A lubricant is provided in the system which ideally is uniformly mixed in the refrigerant and flows around the system with the refrigerant to lubricate all the system components, including the compressor.

However, when the system has not been used for a period of time, for example over a day or longer, refrigerant in liquid form can pool in low areas in the system. Further, the lubricant can separate out of the refrigerant and pool in the low areas as well. On the next occasion that the compressor is operated, it must purge the liquid refrigerant and lubricant, which generates noise and places stress in the components of the compressor. This is sometimes referred to as liquid slugging. The presence of slugs of liquid can cause vibration, noise, clutch failure, and/or damage to the compressor because the collected liquid cannot be compressed.

Attempts have been made to address this problem by intermittently starting the compressor to purge the liquid by controlling the clutch operation. For example, Japanese Patent Application Publication 55-012277A of Jan. 28, 1980 discloses a starting controller for a compressor, such as used in a vehicle, which causes the magnetic clutch driving the compressor to be intermittently engaged to discharge liquids from the compressor before beginning continuous operation after a predetermined lapse of time. The document discloses two on/off cycles before beginning continuous operation. The document suggests operation of the clutch for approximately 1/50 to 1/10 second intervals, as an example. Japanese Unexamined Utility Model Application 58-116964 of Aug. 10, 1983 discloses a control device for a vehicle air conditioner that performs on/off control of an electromagnetic clutch for three on/off cycles before beginning continuous operation. U.S. Pat. No. 7,836,715 issued Nov. 23, 2010 to Eisenhour discloses a similar device.

However, a need exists to provide an enhanced mechanism to reduce the wear and noise generated by this slugging condition.

SUMMARY OF THE INVENTION

In accordance with one aspect of the present invention, an apparatus is provided for interrupting operation of a compressor upon start up for use in a vehicle air conditioning (A/C) system. The A/C system has a compressor, an electrically operated compressor clutch and a control for energizing the compressor clutch during normal A/C operation through a power lead connected between the control and the clutch. The clutch also has a ground lead. The apparatus includes a switch connected to the power lead between the control and the clutch and connected in the ground lead between the clutch and a ground. The switch intermittently operates the clutch for a predetermined period of time each time the control provides power to operate the clutch to prevent slugging of the compressor. The switch can have a timer circuit to prevent intermittent operation for a set period of time after an initial intermittent operation.

In accordance with another aspect of the present invention, the apparatus has a microcontroller for generating an output signal at a first level intermittently for a predetermined period when the control initially provides power to operate the clutch and then subsequently maintains the output signal at the first level as long as the control provides power to operate the clutch. The apparatus further has a power transistor connected in the ground lead between the clutch and ground, an output signal at the first level from the microcontroller switching on the power transistor to ground the clutch lead to permit operation of the clutch. In accordance with another aspect of the present invention, the apparatus has a voltage regulator to provide a regulated input voltage to the microcontroller. The apparatus can further have a switching transistor element receiving the output signal of the microcontroller and switching on the power transistor when the output signal from the microcontroller is at the first level. The apparatus can further have a diode connected between the power lead and the ground lead to prevent damage to other circuits in the vehicle. The apparatus can have a battery to power the microcontroller for a set period of time to prevent intermittent operation for the set period of time after an initial intermittent operation.

In accordance with another aspect of the present invention, the output signal is alternately at the first level and at a second level for ½ second intervals for 3 seconds, at the first level for an additional 3 seconds, at the second level for an additional 3 seconds and thereafter at the first level while the control provides power to operate the clutch.

In accordance with another aspect of the present invention, the apparatus is encapsulated in a waterproof casing suitable for mounting within the engine compartment of a vehicle.

In accordance with another aspect of the present invention, a method is provided for interrupting operation of a compressor upon start up for use in a vehicle air conditioning (A/C) system. The A/C system has a compressor, an electrically operated compressor clutch and a control for energizing the compressor clutch during normal A/C operation through a power lead connected between the control and the clutch. The clutch also has a ground lead. The method includes the step of controlling the grounding of the clutch through the ground lead to ground with an apparatus including a switch connected to the power lead between the control and the clutch and connected between the ground lead from the clutch and ground. The switch intermittently grounds the clutch ground lead for a predetermined period of time each time the control provides power to operate the clutch for interrupting operation of the compressor upon start up and thereafter maintains the ground lead connected to the ground.

BRIEF DESCRIPTION OF THE DRAWINGS

A more complete understanding of the invention and its advantages will be apparent from the following Detailed Description, taken in conjunction with the accompanying Drawings, in which.

DETAILED DESCRIPTION

Figure 1:
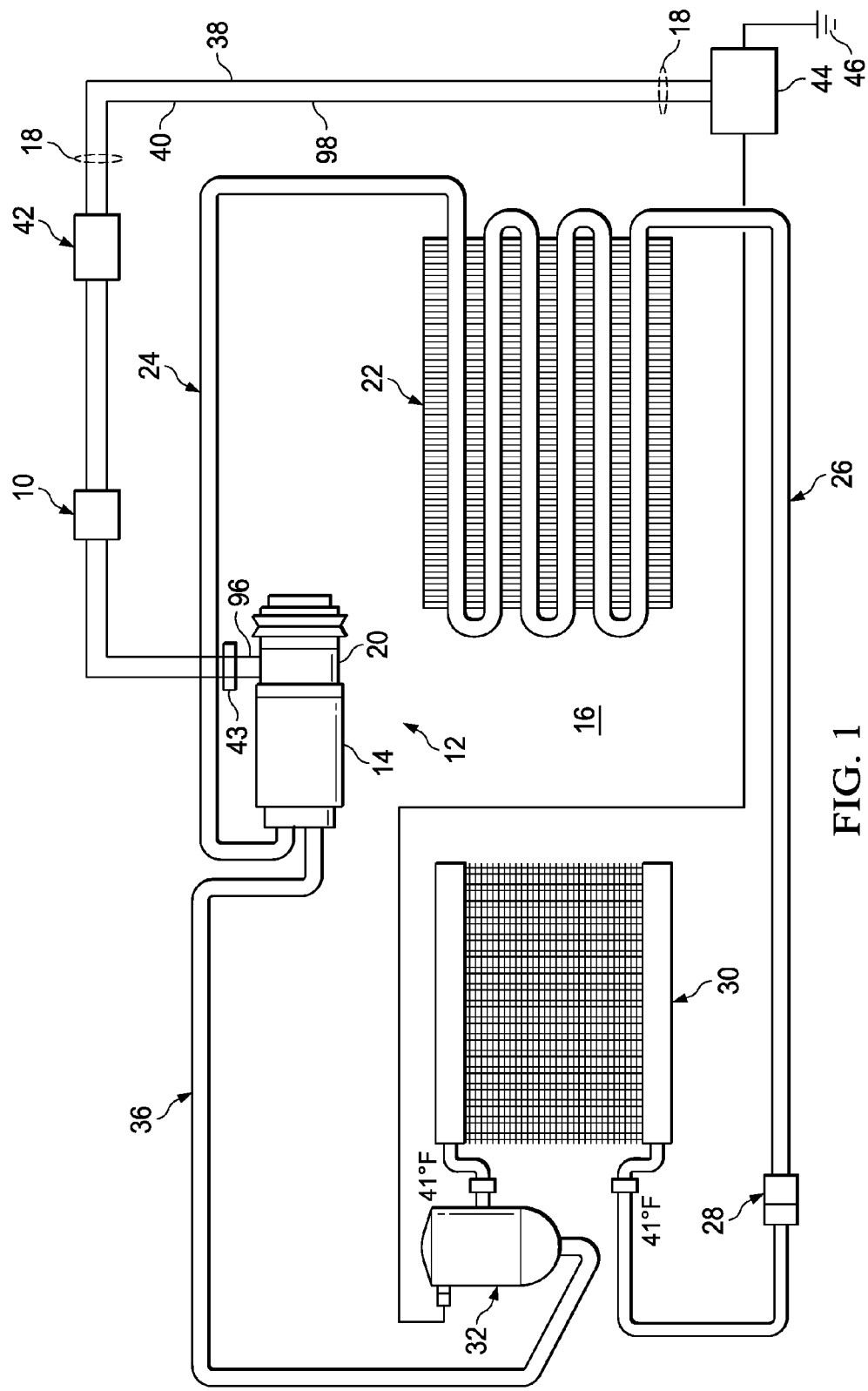
FIG. 1 is a schematic of a vehicle air conditioning system incorporating a first embodiment of the present invention providing for intermittent starting of the compressor.

With reference now to the figures, FIGS. 1-7 illustrate a switch 10 that is used in an air conditioning (A/C) system 12 to intermittently operate the compressor 14 upon initial start up. The intermittent operation prevents slugging by purging lubrication oil and liquid refrigerant that can collect in the compressor 14 after a period of non-use. Typically, the A/C system 12 will be in a vehicle 16, such as an automobile.

The switch 10 is connected between the vehicle A/C electrical wiring harness 18 and the A/C electrical clutch 20. When energized, the clutch 20 connects the compressor 14 to a drive source, typically the engine in the vehicle 16, to rotate the compressor and operate the A/C system 12. A significant advantage of the present invention is the switch 10 can be retro-fitted to an existing vehicle by simply adapting the connectors on the switch 10 to fit the intended application. The design of the switch 10 is universal in that it can be used on any make or model vehicle by using the appropriate connectors.

With reference to FIG. 1, a typical installation of the switch 10 in an A/C system 12 within a vehicle 16 is illustrated. As is typical, the A/C system 12 includes compressor 14 that is operated by the vehicle engine, usually through a fan belt, when the clutch 20 is energized to connect the compressor to the engine. Rotation of the compressor 14 compresses gaseous refrigerant and drives the compressed refrigerant to a condenser 22 through a discharge line 24. In the condenser 22, the refrigerant is liquefied, giving off heat. As shown in FIG. 1, the refrigerant entering the condenser 22 may be, for example, at 160 degrees F. and at 127 degrees F. when leaving the condenser 22 through the liquid line 26. An orifice tube 28 is placed in the liquid line 26 to allow expansion of the refrigerant to the gaseous state to enter evaporator 30. As the refrigerant expands, it absorbs heat while passing through the evaporator 30 to provide cooling to the interior of the vehicle. The refrigerant leaves the evaporator 30 and enters an accumulator/pressure cycling switch 32 before returning to the input of the compressor 14 through suction line 36. An A/C system control 44 operates the system by energizing the clutch 20 through the A/C wiring harness 18 when A/C operation is requested. A/C system control 44 can be a microprocessor based automatic climate control, sensing interior and exterior temperatures and automatically operating the A/C system to achieve the desired temperature in the vehicle interior, as found in many vehicles, or a more basic manual on/off A/C control switch as found in older or more basic vehicles, for example.

Figure 2:
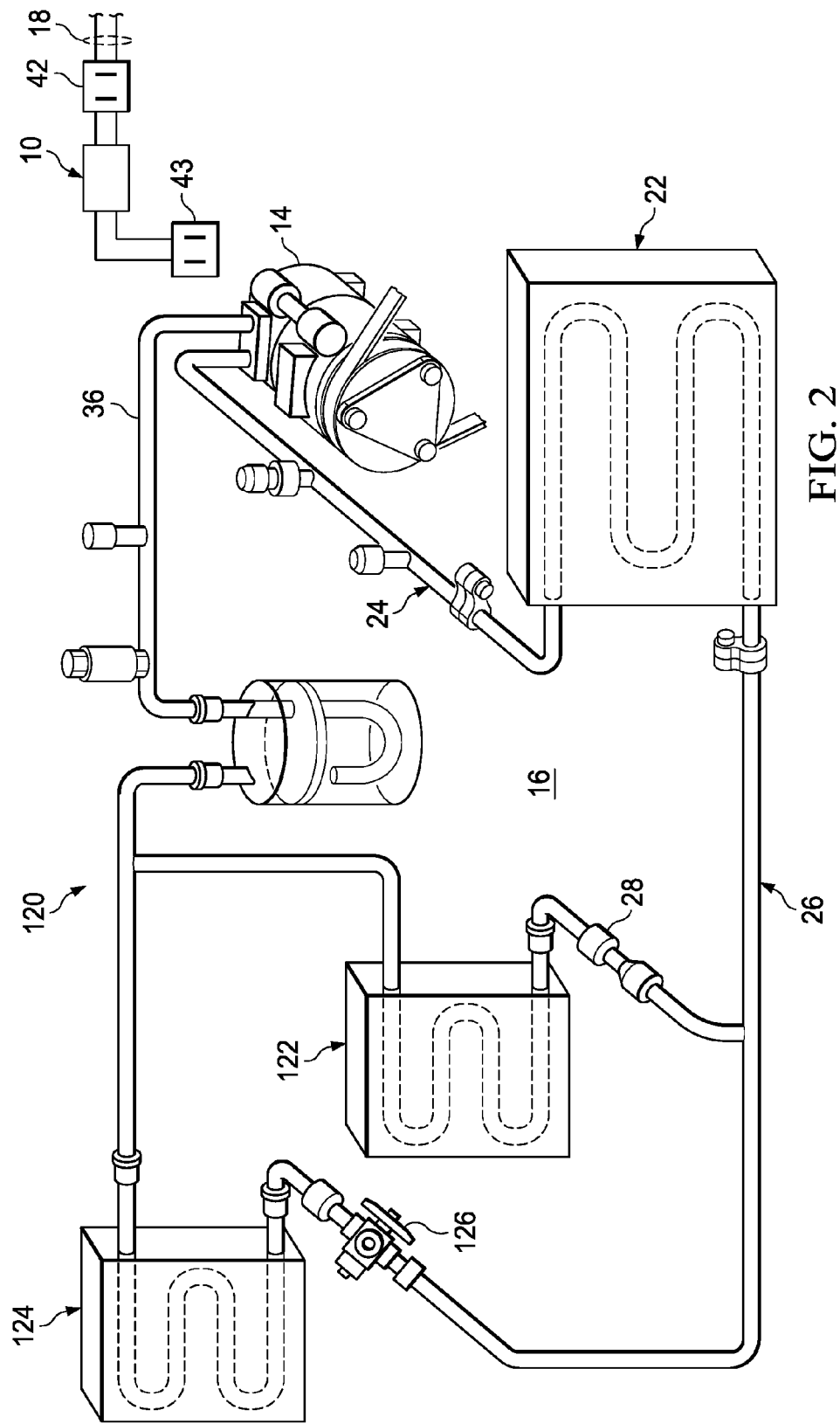
FIG. 2 is a schematic of a vehicle air conditioning system having dual evaporators incorporating the first embodiment of the present invention providing for intermittent starting of the compressor.

FIG. 2 illustrates another A/C system 120 that has many of the same components as A/C system 12 which are identified with the same reference numerals. However, A/C system 120 would be typical for use in a larger vehicle, such as an SUV, as it includes a separate front evaporator 122 and rear evaporator 124. Rear evaporator 124 utilizes a TXV valve 126.

Figure 3:
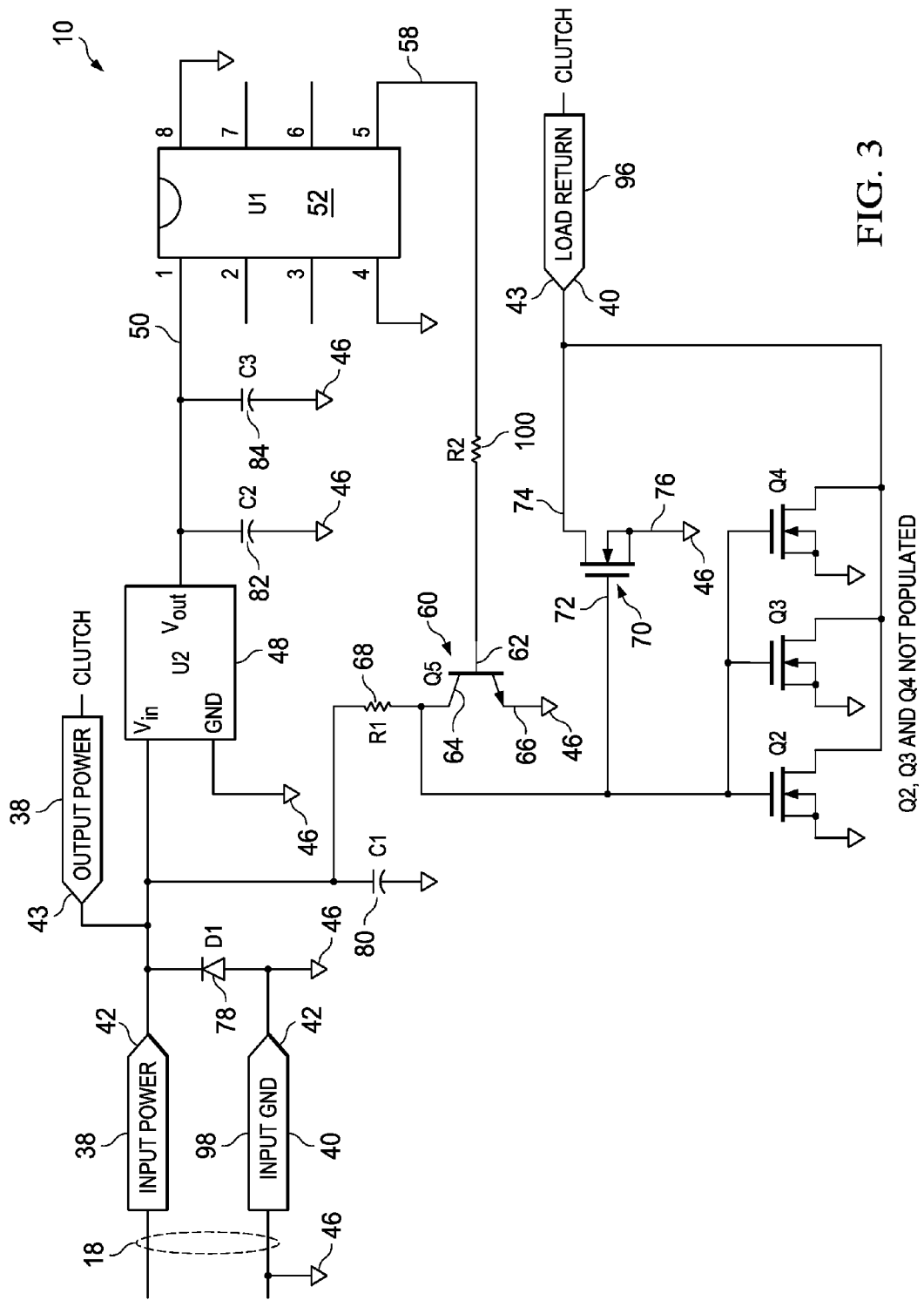
FIG. 3 is a schematic of the circuit of the first embodiment of the present invention.

In either A/C system 12 or 120, the switch 10 is placed in the circuit between the A/C wiring harness 18 and the clutch 20. In particular, the A/C wiring harness 18 includes a power lead 38 and a ground lead 40 which typically are connected directly to the clutch 20. However, when switch 10 is used, switch 10 is connected to the power lead 38 and ground lead 40 between the A/C wiring harness 18 and the clutch 20. With reference to FIGS. 1 and 3, the switch 10 can be seen to have a connector 42 connected to the power lead 38 extending from the A/C system control 44 through wiring harness 18. Switch 10 also has a connector 43 connected to the power lead going to clutch 20. Connector 42 thus only receives power when the A/C system control 44 energizes the power lead 38 to energize the clutch 20 and operate the compressor 14, usually by connecting positive battery voltage of 12 Volts to the power lead 38. The switch 10 is thus only powered when power lead 38 is energized and is not directly powered off the vehicle battery or power distribution circuits.

The switch 10 is also connected between the portion 96 of the ground lead 40 extending from the clutch 20 at connector 43 and the portion 98 of the ground lead 40 from wiring harness 18 through connector 42. Portion 98 of the ground lead from wiring harness 18 is connected in some manner to the vehicle ground 46. It should be noted that a ground path can only be completed from clutch 20 to the vehicle ground 46 through the switch 10, as will be explained in greater detail hereinafter. As such, the clutch 20 will not be energized unless switch 10 provides the ground path, even though power lead 38 may be energized.

Within switch 10, a voltage regulator 48 is connected between the power lead 38 through connector 42 and ground 46 and provides a stable, controlled output voltage at output line 50 to a microcontroller 52. For ease of understanding, grounds 46 are shown on the circuit diagrams of FIGS. 3 and 8, even though the actual ground circuit would pass through ground lead 40 at connector 42 to the ground 46 in the vehicle. As will be described in greater detail hereinafter, immediately upon receiving power from the line 50, the microcontroller enters a programmed timing sequence which alternately outputs a first higher voltage signal level 54 and a second lower voltage signal level 56 on output line 58. For example, the microcontroller 52 may cycle the output line 58 between first signal level 54 and second signal level 56 at ½ second intervals for 3 seconds, then maintain the output line 58 at the first signal level 54 for about 3 seconds, then maintain the output line 58 at the second signal level 56 for about 3 seconds and thereafter maintain the output line 58 at the first signal level 54 as long as the microcontroller 52 is powered.

Figure 4:
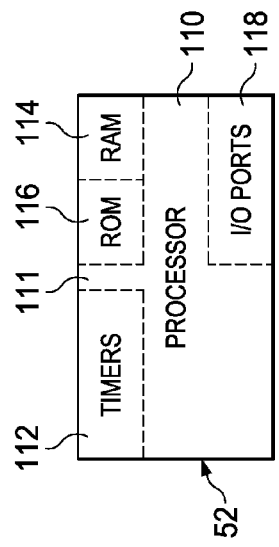
FIG. 4 is a schematic view of the microcontroller used in the first embodiment of the present invention.

The microcontroller 52 can be of any suitable design. As shown in FIG. 4, a typical microcontroller 52 will include a central processing unit CPU 110, a series of timers 112, a random access memory RAM 114, a read only memory ROM 116 and various input/output I/O ports 118. Other timing circuits can be substituted for the microcontroller 52 if desired, such as a logic array, capacitor based timing circuits and the like.

The output line 58 of the microcontroller 52 connects to the base 62 of a switching transistor 60 through a resistor 100. The collector 64 of transistor 60 is connected through a resistor 68 to power lead 38 at connector 42. The emitter 66 of transistor 60 is connected to ground 46. The collector 64 of transistor 60 is also connected to the gate 72 of a FET power transistor 70. The drain 74 of transistor 70 is connected to the portion 96 of the ground lead 40 from the clutch and the source 76 of transistor 70 is connected to the portion 98 of ground lead 40 connecting to ground 46. Only when transistor 70 is on and conducting will the portion 96 of the ground lead 40 be connected to ground 46 and the clutch be energized.

In operation, if A/C operation is not requested, the control 44 will not provide power to the power lead 38 and neither the clutch 20 nor the switch 10 will be energized. However, when A/C operation is requested, for example by the vehicle operator turning on the A/C system or the control 44 sensing the need for A/C operation by monitoring the vehicle interior temperature, control 44 will energize the power lead 38. However, as noted, the clutch 20 can only be energized if the portion 96 of the ground lead 40 is connected to ground 46 through power transistor 70 and the power transistor 70 is on and conducting.

Once power lead 38 is energized, voltage regulator 48 provides a regulated output voltage to power microcontroller 52. Microcontroller 52 then enters its programmed sequence to output at line 58 the first signal voltage 54 for time period t0 to t1, transition to second signal voltage 56 for the time period t1 to t2, transition back to first signal voltage 54 for time period t2 to t3, transition to second signal voltage 56 for time period t3 to t4, transition back to first signal voltage 54 for time period t4 to t5, transition to second signal voltage 56 for time period t5 to t6, transition back to first signal voltage 54 for time period t6 to t7, transition to second signal voltage 56 for time period t7 to t8 and finally transition back to first signal voltage 54 for time period t8 to some point in time t9 which lasts as long as the power lead 38 is energized.

For example, the time interval between t0 to t1, t1 to t2, t2 to t3, t3 to t4, t4 to t5 and t5 to t6 can each be 0.5 seconds in duration. Time interval t6 to t7 and t7 to t8 can each be 3.0 seconds in duration and the interval t8 to t9 will be as long as the power is provided to power lead 38.

When the first signal voltage 54 is output from microcontroller 52, the switching transistor 60 causes the power transistor 70 to turn on, establishing a ground path from the portion 96 of ground lead 40 to ground 46 and energizing the clutch 20 to drive the compressor 14. When the second signal voltage 56 is output from the microcontroller 52, the power transistor 70 is turned off and the portion 96 of the ground lead 40 is not connected to ground 46, preventing energization of the clutch 20, even though the power lead 38 is energized.

Figure 5:
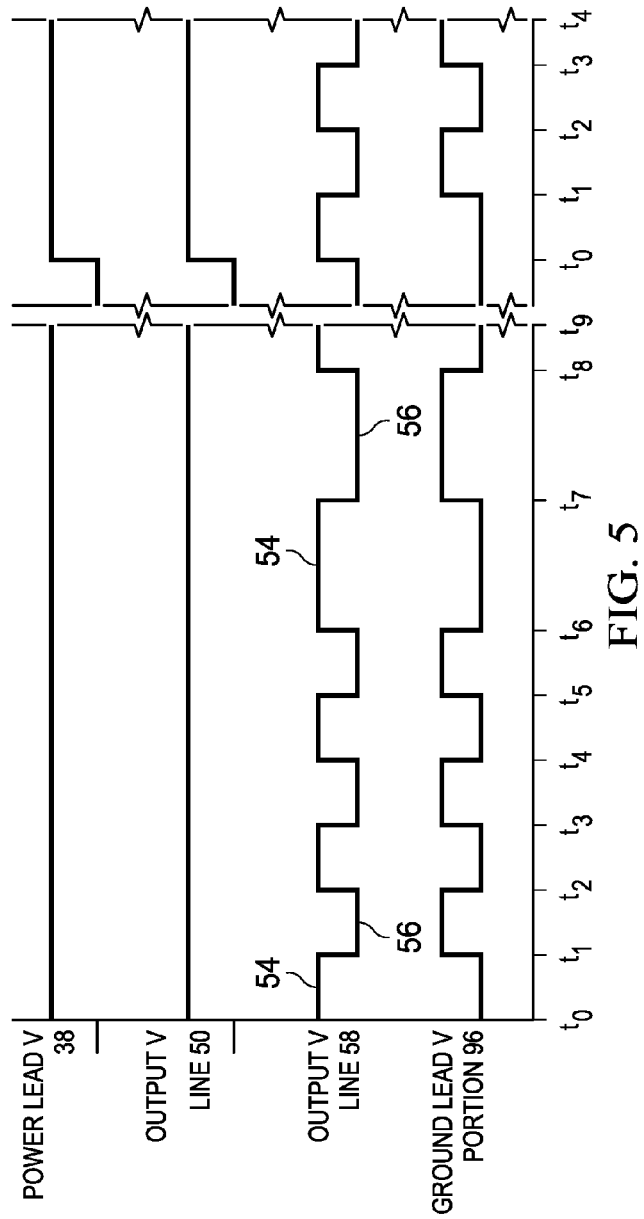
FIG. 5 is a timing diagram of the circuit.

FIG. 5 illustrates a timing chart for the operation of switch 10, showing the voltages a various points in the switch 10. As soon as power lead 38 is energized at t0, the voltage will rise to the level necessary to energize the clutch 20, typically 12-14 volts DC. The voltage regulator will put out the regulated voltage to power the microcontroller 52 on output line 50, typically 3 to 5 volts DC. When powered, the microcontroller 52 enters the programmed sequence to send the $1^{st}$ and $2^{nd}$ signal levels 54 or 56 along output line 58. The power transistor 70 is turned on and off in consequence, resulting in the voltage levels shown for portion 96 of ground lead 40. When portion 96 is grounded, the clutch 20 is energized. When portion 96 is not grounded, the full voltage from the power lead 38 appears on the portion 96 of the ground lead 40 through the winding of the clutch solenoid, indicating no path to ground for the clutch, which prevents energization of the clutch.

In this manner, when power is initially supplied to power lead 38, the clutch 20 and compressor 14 undergo intermittent operation to turn the compressor a few revolutions, and then disengage the clutch for a period, which allows oil and liquid refrigerant that has collected in the compressor to move through the system from the compressor. This process is repeated for at least four cycles. After the cycling action has purged the liquid from the compressor, the compressor is operated normally as long as the power lead 38 remains energized. If the power lead 38 is deenergized, as by turning the A/C system 12 off or in the normal cycling of A/C system operation, the next time the power lead 38 is energized, the intermittent cycling of the compressor and clutch is again repeated.

Figure 6:
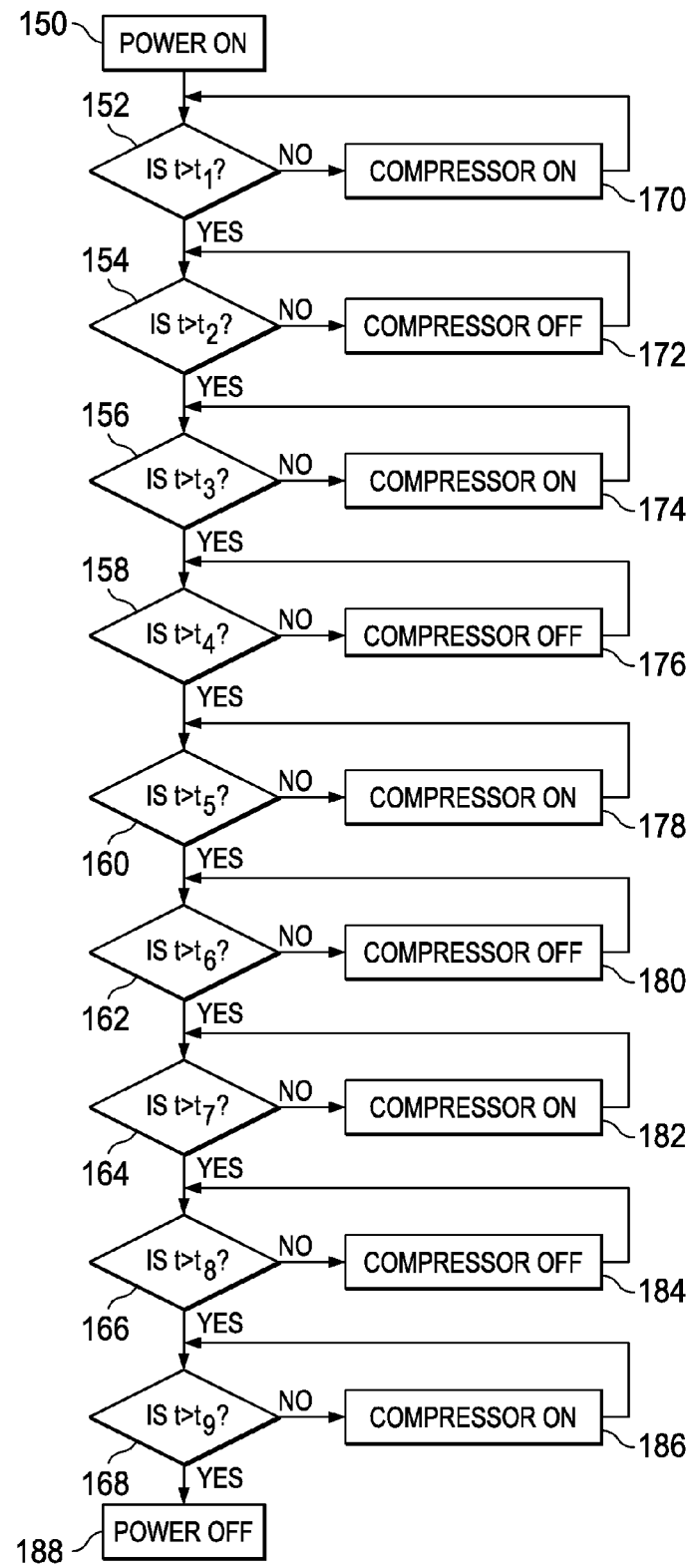
FIG. 6 is a logic flow diagram for the operation of the microcontroller used in the first embodiment of the present invention.

With reference to FIG. 6, a flow chart of the programming of microcontroller 52 is shown. At step 150, power is provided to the microcontroller which initiates the programmed sequence. As time t progresses from initial start up t0, the program goes through a series of decision steps 152-168. For example, when t0<t<t1, step 152 represents output of the $1^{st}$ signal level 54 on output line 58 to allow compressor operation, as represented by step 170. When t>t1, the program moves to step 154. As long as t<t2, step 154 represents output of the 2nd signal level 56 on output line 58 to stop compressor operation, as represented by step 172. When t>t2, the program moves to step 156. The program then proceeds through the remainder of the steps 156-168 and 174-186, intermittently operating the compressor 14 until t>t8 at which time the compressor stays on as long a power is provided on power lead 38. At step 188, power is removed from power lead 38 and power is no longer provided to the microcontroller 52. When power is again provided to power lead 38, the microcontroller 52 begins again at step 150.

The vehicle 16 is protected by placing a reverse biased diode 78 between the power lead 38 and ground 46, which will prevent any damage to other electrical and/or mechanical systems in the vehicle should the switch 10 malfunction for any reason. A capacitor 80 is placed between the power lead 38 and ground 46 to protect the input to the voltage regulator 48 and the transistor 60. Two filter capacitors 82 and 84 filter the regulated voltage input to the microcontroller 52.

Figure 7:
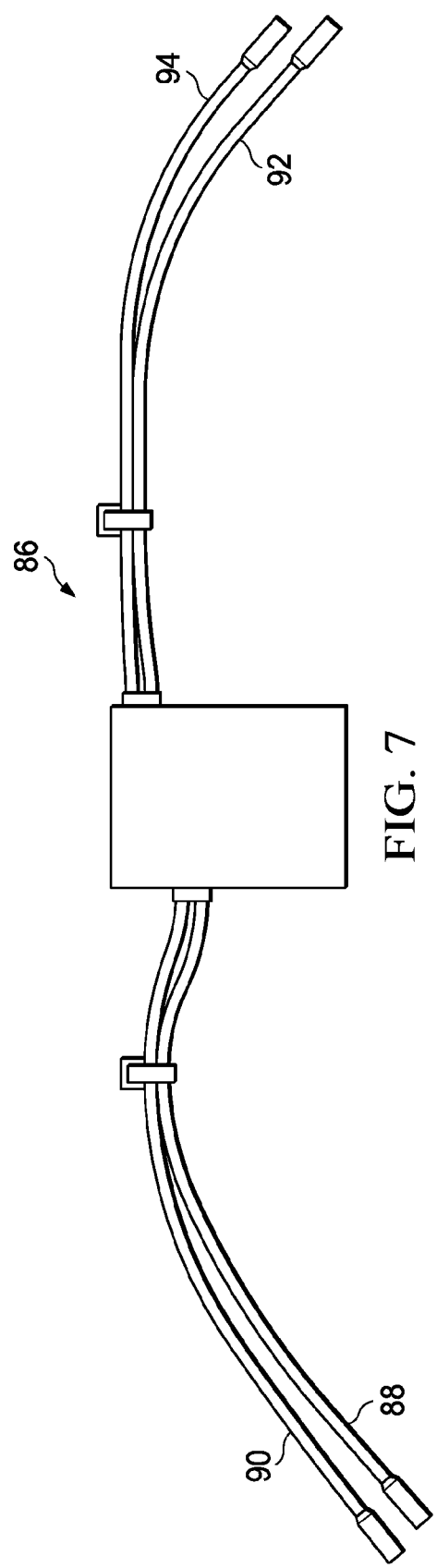
FIG. 7 is a view of the first embodiment of the present invention configured for retrofitting on existing vehicles.

With reference to FIG. 7, the switch 10 is preferably encapsulated in a waterproof casing 86 having four leads 88, 90, 92 and 94 extending therefrom. Lead 88 is connected to the power lead 38 from the control 44 while lead 90 is connected to the portion 98 of the ground lead 40 from the wiring harness 18 connecting to ground 46. Lead 92 is connected to the power lead 38 extending to the clutch 20 and lead 94 is connected to the portion 96 of ground lead 40 coming from the clutch 20. Leads 88 and 92 can be combined into a single lead and tapped into the power lead 38 if desired. By using leads 88 and 92, the current flow for energizing the clutch 20 flows through the leads 88 and 92, as well as powering switch 10. The design of the switch 10 is universal in that it can be used on any make or model vehicle as long as the connection leads are adapted to fit the intended application.

The switch 10 can, if desired, actually be mounted on the compressor 14 or with the clutch 20. In such a design, if the compressor or clutch is a replacement unit, the wiring on the compressor or clutch can be integrated with the switch 10 such that the only connection to the vehicle wiring harness is through the same connector used to operate a conventional compressor or clutch without a switch 10.

It will be appreciated that the advantages of the present invention can be retroactively applied to existing vehicles.

This allows all the current vehicles in existence to potentially take advantage of the benefits provided by the present invention.

Also, while the switch 10 is described as controlling the ground path from the clutch 20 to create intermittent operation, switch 10 could alternatively be designed to control the current path on power lead 38, or both the ground path and path on power lead 38.

In one design constructed in accordance with the teachings of the present invention, the voltage regulator is a HT7130 chip, the microcontroller is an 8 bit model HR6P59HL microcontroller manufactured by Haier Group of China, the switching transistor is an S8050 NPN transistor, the power transistor is an N-channel enhancement mode FET 65N06 power transistor, resistor 68 is 200K Ohms, resistor 100 is 18K Ohms, capacitor 80 is 470 microfarads, capacitor 82 is 47 microfarads and capacitor 84 is 100 picofarads.

Figure 8:
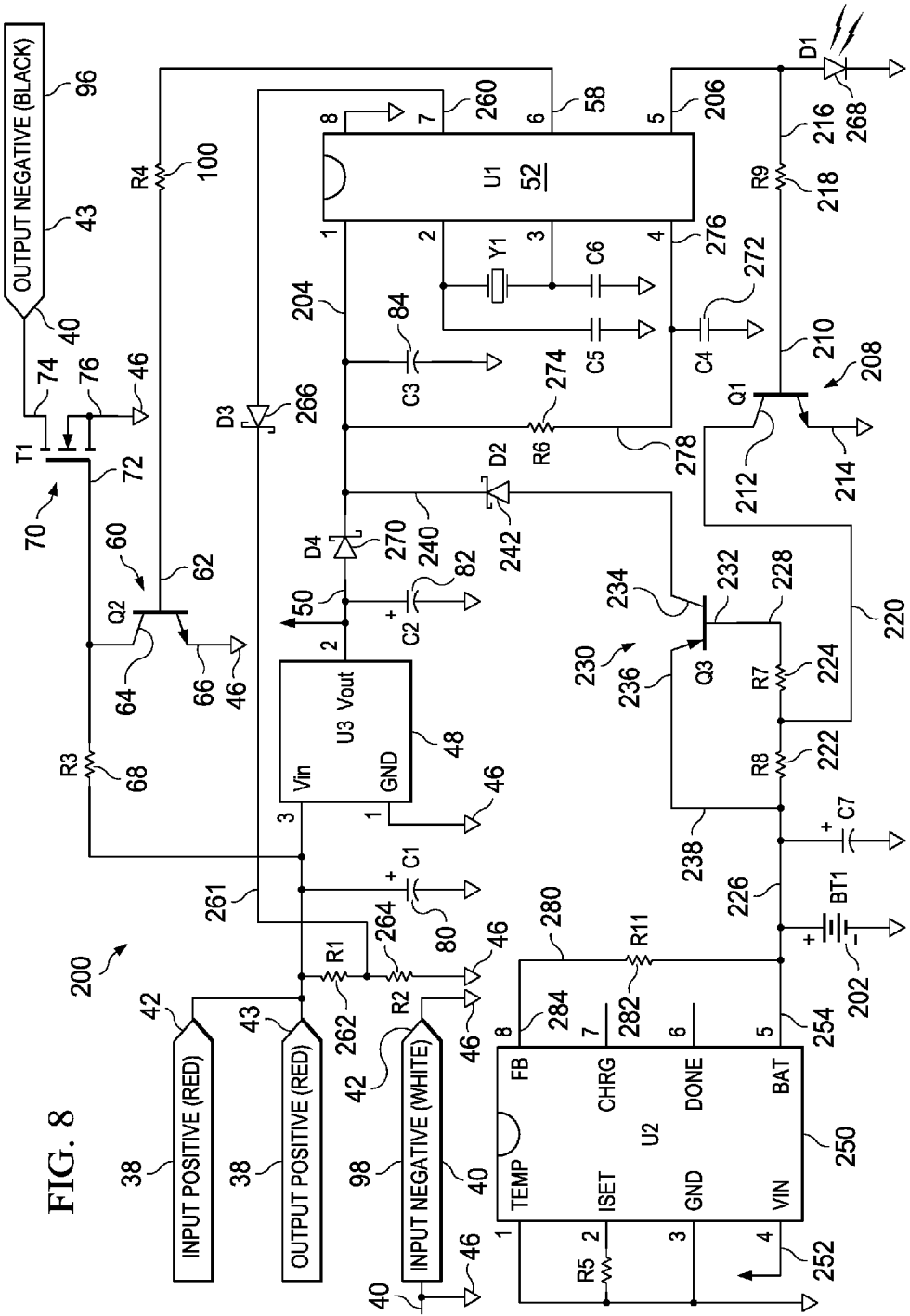
FIG. 8 is schematic of a circuit forming a first modification of the present invention

With reference now to FIG. 8, a first modification of the switch 10 will be described as switch 200. Many components of switch 200 are identical to those of switch 10 and have been identified by the same reference numerals in FIG. 8. Switch 200 differs from switch 10 in providing power to the microcontroller 52 for a set period of time, for example 30 minutes, after power has been removed from the power lead 38. This will prevent the microcontroller 52 from entering the programmed sequence to intermittently operate the compressor 14 each time power is provided to lead 38 within the set period of time, as during normal on/off operation of the A/C system 12. Also, if the vehicle 16 is turned off, but restarted within the set period of time, as would happen at a short stop at a convenience store, for example, the microcontroller 52 will not enter the programmed sequence to intermittently operate the compressor 14 if the A/C system 12 is on when the vehicle 16 is restarted. Once the A/C system 10 has been purged of lubrication oil and liquid refrigerant upon initially starting operation of the A/C system, it is not necessary to redo this purging process for this set period of time as slugging would not yet have reoccurred.

Switch 200 maintains power to the microcontroller 52 when power has been removed from the power lead 38 by use of a battery 202 which is connected to the power input pin 204 of the microcontroller 52. The battery 202 has sufficient charge to power and maintain operation of the microcontroller 52 for the set period of time, for example 30 minutes, in the absence of power at the power lead 38.

At the end of the initial programmed sequence to intermittently operate the compressor 14 after the A/C system has been off for sufficient time to raise concern of slugging and the battery 202 is drained, pin 206 of microcontroller 52 goes high, providing a positive voltage to the base 210 of a transistor 208 through line 216 and resistor 218. This switches transistor 208 on, connecting the collector 212 to the emitter 214 and ground through the transistor 208. A line 220 connects the collector 212 of transistor 208 to one end of resistors 222 and 224. The other end of resistor 222 is connected to the positive terminal of the battery 202 by line 226. The other end of resistor 224 is connected through line 228 to the base 232 of a transistor 230. The emitter 236 of transistor 230 is connected to the positive terminal of the battery 202 by line 238. The collector 234 of transistor 230 is connected by line 240 to the output line 50 and input pin 204 through a rectifier 242. When transistor 208 is turned on, a voltage differential is created across resistors 222 and 224, turning on transistor 230 and connecting the positive terminal of the battery 202 to input pin 204 to power the microcontroller 52 independently of the power lead 38. The capacity of the battery 202 is designed to provide power to independently operate the microcontroller 52 for the set period of time, for example 30 minutes, when the battery 202 is fully charged. After the set period of time, the battery 202 has discharged to the point the microcontroller 52 will no longer be powered. Therefore, the next time power is provided to the power lead 38, the microcontroller 52 will enter the programmed sequence to intermittently operate the compressor 14.

The battery 202 is recharged during regular operation of the A/C system 12, when power is provided to power lead 38, by use of a battery charger 250. Battery charger 250 is a charger provided in a single surface mounted or dual inline pin package powered by the output of the voltage regulator on line 50 to pin 252 of the battery charger 250. When power is provided to battery charger 250 at pin 252, battery charger 250 provides an output at pin 254 at the correct voltage to charge the battery 202. A line 280 connects line 226 to pin 284 of the battery charger 250 through resistor 282. This provides feedback of the battery voltage to the battery charger 250 to control the charge. The battery charger 250 is designed so that when it loses power at pin 252, it will not be a significant drain on the battery 202. If the A/C system 12 is not operated sufficiently to recharge the battery 202 for some interval of operation of the vehicle 16, this is of little consequence. The only result is that the battery 202 might only be able to power the microcontroller 52 for a period of time shorter than the set period of time, or not be able to power the microcontroller at all. However, the only consequence is the microcontroller 52 will initiate the intermittent operation of the compressor 14 every time the power lead 38 is activated until the battery 202 is sufficiently recharged, which will not significantly harm operation of the A/C system 12.

The microcontroller 52 can sense the absence of power at power lead 38 by connecting a line 261 from pin 260 of microcontroller 52 to a voltage divider formed by resistors 262 and 264. Resistor 262 and 264 are connected in series between power lead 38 and ground 46. A rectifier 266 is placed in line 261 to prevent harm to the microcontroller 52. A line 278 connects pin 276 of the microcontroller 52 to line 204 through resistor 274. Capacitor 272 connects pin 276 to ground 46. Line 278 permits the microcontroller 52 to read the input to pin 204, allowing the microcontroller 52 to react to a lower voltage change as power draw is shifted from power lead 38 to the battery 202. An LED 268 can be connected between output pin 206 and ground 46 to monitor operation.

The set period of time the battery 202 can power the microcontroller 52 can be chosen for a particular A/C system design. As noted, a set period of 30 minutes is contemplated. However, other set periods can be chosen. Also, any other suitable technique to power the microcontroller 52 for a set period of time in the absence of power on power lead 38 can be used instead of a battery 202, such as a capacitor, the battery of the vehicle 16, etc.

The battery 202 is preferably a rechargeable Lithium battery. In one design of switch 200 constructed in accordance with the teachings of the present invention, the voltage regulator is a SA1117 chip, the microcontroller is an 8 bit model HR6P59HL microcontroller manufactured by Haier Group of China, the switching transistor 208 is an S8050 NPN transistor, the switching transistor 230 is an S8550 PNP transistor, the power transistor 70 is an N-channel enhancement mode FET 65N06 power transistor, battery 202 is a 3.7 volt 0.2 amp Lithium battery, battery charger

250 is a model CN3058 500 mA battery charger manufactured by Consonance Electronics Co. Ltd of Shanghai, China, rectifiers 242, 266 and 270 are an SS14 Schottky power rectifier.

While a single embodiment of the present invention has been illustrated in the accompanying drawings and described in the foregoing Detailed Description, it will be understood that the invention is not limited to the embodiment disclosed, but is capable of numerous rearrangements, modifications and substitutions of parts and elements without departing from the scope and spirit of the invention.

The invention claimed is:

1. A method for interrupting operation of a compressor upon start up for use in a vehicle air conditioning system having a compressor, an electrically operated compressor clutch and a control for energizing the compressor clutch during normal A/C operation through a power lead connected between the control and the clutch, the clutch also having a ground lead, comprising the steps of:
intermittently grounding the ground lead from the clutch to a ground for a predetermined period of time each time the control provides power to operate the clutch with an apparatus including a switch connected to the power lead between the control and the clutch and connected to the ground lead from the clutch and ground for interrupting operation of the compressor upon start up;
the step of intermittently grounding the ground lead from the clutch further comprising the step of intermittently providing an on signal to a power transistor to complete a path between the ground lead from the clutch and ground.

2. The method of claim 1 wherein the step of providing an on signal to a power transistor includes the step of generating the on signal with a microcontroller powered by the power lead connected between the control and the clutch.

3. The method of claim 2 wherein the step of generating the on signal with a microcontroller powered by the power lead connected between the control and clutch further includes regulating voltage from the power lead to the microcontroller with a voltage regulator.

4. The method of claim 1 further comprising the step of protecting other circuits in the system by connecting a diode between the power lead and the ground lead from the clutch.

5. The method of claim 1 further comprising the step of installing the switch in an existing air conditioning system by connecting the switch to the power lead between the control and the clutch and connecting the switch between the ground lead from the clutch and ground.

6. The method of claim 2 wherein the step of generating the on signal further comprises the step of switching a switching transistor through the microcontroller to a state to provide the on signal to the power transistor.

7. The method of claim 1 further comprising the step of preventing interruption of operation of the compressor for a set period of time after the switch initially connects the power lead between the control and the clutch and connects the ground lead from the clutch and ground for interrupting operation of the compressor upon start up.

8. A method for interrupting operation of a compressor upon start up for use in a vehicle air conditioning system having a compressor, an electrically operated compressor clutch and a control for energizing the compressor clutch during normal A/C operation through a power lead connected between the control and the clutch, the clutch also having a ground lead, comprising the steps of:
intermittently grounding the ground lead from the clutch to a ground for a predetermined period of time each time the control provides power to operate the clutch with an apparatus including a switch connected to the power lead between the control and the clutch and connected to the ground lead from the clutch and ground for interrupting operation of the compressor upon start up;
wherein the step of intermittently grounding the ground lead from the clutch further comprises the step of intermittently providing an on signal to a power transistor to complete a path between the ground lead from the clutch and ground; and
wherein the step of providing an on signal to a power transistor comprises the step of generating the on signal with a microcontroller powered by the power lead connected between the control and the clutch.

9. The method of claim 8 further comprising the step of installing the switch in an existing air conditioning system by connecting the switch to the power lead between the control and the clutch and connecting the switch between the ground lead from the clutch and a-ground.

10. The method of claim 8 further comprising the step of connecting the switch to the power lead and between the ground lead from the clutch and ground in an existing vehicle without previous capability for intermittent clutch operation when power is provided from the control to the clutch for normal air conditioning operation.

11. The method of claim 8 further comprising the step of continuously operating the clutch as long as power is provided to the power lead after a predetermined period of the switch initially intermittently operating the clutch.

12. The method of claim 8 further comprising the step of alternately grounding the ground lead and not grounding the ground lead for ½ second intervals for 3 seconds, grounding the ground lead for an additional 3 seconds, not grounding the ground lead for an additional 3 seconds and thereafter grounding the ground lead while the control provides power to operate the clutch.

13. The method of claim 8 further comprising the step of powering the microcontroller independently of the power lead for a set period of time after the switch initially intermittently operates the clutch to prevent intermittently operating the clutch during the set period.

14. The method of claim 13 wherein the step of powering the microcontroller independently of the power lead for a set period of time includes the stop of powering the microcontroller with a battery.

15. The method of claim 8 further comprising the step of encapsulating the switch in a waterproof casing, at least first, second, and third leads extending there from for connection to the power lead and ground lead.

16. The method of claim 8 further comprising the step of mounting the switch on the compressor.

* * * * *